United States Patent [19]
Pott

[11] Patent Number: 4,647,326
[45] Date of Patent: Mar. 3, 1987

[54] METHOD OF MANUFACTURING A SHAPE FROM A COMPOSITE MATERIAL

[75] Inventor: Richard Pott, Lage, Fed. Rep. of Germany

[73] Assignee: Aerotex Hochleistungsfaser GmbH, Willich, Fed. Rep. of Germany

[21] Appl. No.: 784,710

[22] Filed: Oct. 4, 1985

Related U.S. Application Data

[63] Continuation of Ser. No. 562,687, Dec. 19, 1983, abandoned.

[30] Foreign Application Priority Data

Dec. 17, 1982 [DE] Fed. Rep. of Germany ....... 3246755

[51] Int. Cl.$^4$ ............................................. B32B 31/06
[52] U.S. Cl. ....................................... 156/77; 156/78; 156/184; 156/185; 156/191; 156/192; 156/195; 156/197; 156/244.11; 156/245
[58] Field of Search .................... 156/77, 78, 79, 185, 156/186, 187, 188, 191, 192, 195, 197, 245, 184, 244.11

[56] References Cited
U.S. PATENT DOCUMENTS

| 2,685,118 | 8/1954 | Hunter | 156/149 |
| 3,013,584 | 12/1961 | Reed et al. | 156/197 |
| 3,176,618 | 4/1965 | Forsberg et al. | 156/197 |
| 3,372,075 | 3/1968 | Holt et al. | 156/192 |

Primary Examiner—Caleb Weston
Attorney, Agent, or Firm—Peter K. Kontler

[57] ABSTRACT

A method of manufacturing a shape from a composite material by applying laminations impregnated with plastic resin to a positive mold. At least one cellular, cellular-core layer is applied into the neutral zone of the laminations and embedded into them while the laminations are being built up. The cellular layer is a rigid foam. The cellular-core or honeycomb layer has the axis of each cell radial to that of the shape and can be single, double, or multiple. If double or multiple it may have an interior connective layer consisting of plastic, foil, glass cloth, non-woven carbon-fiber fabric, polyimide, or woven or non-woven fabric impregnated with plastic resin. The cellular-core or honeycomb layer is intended to make the shape more stable and flexurally strong.

21 Claims, 19 Drawing Figures

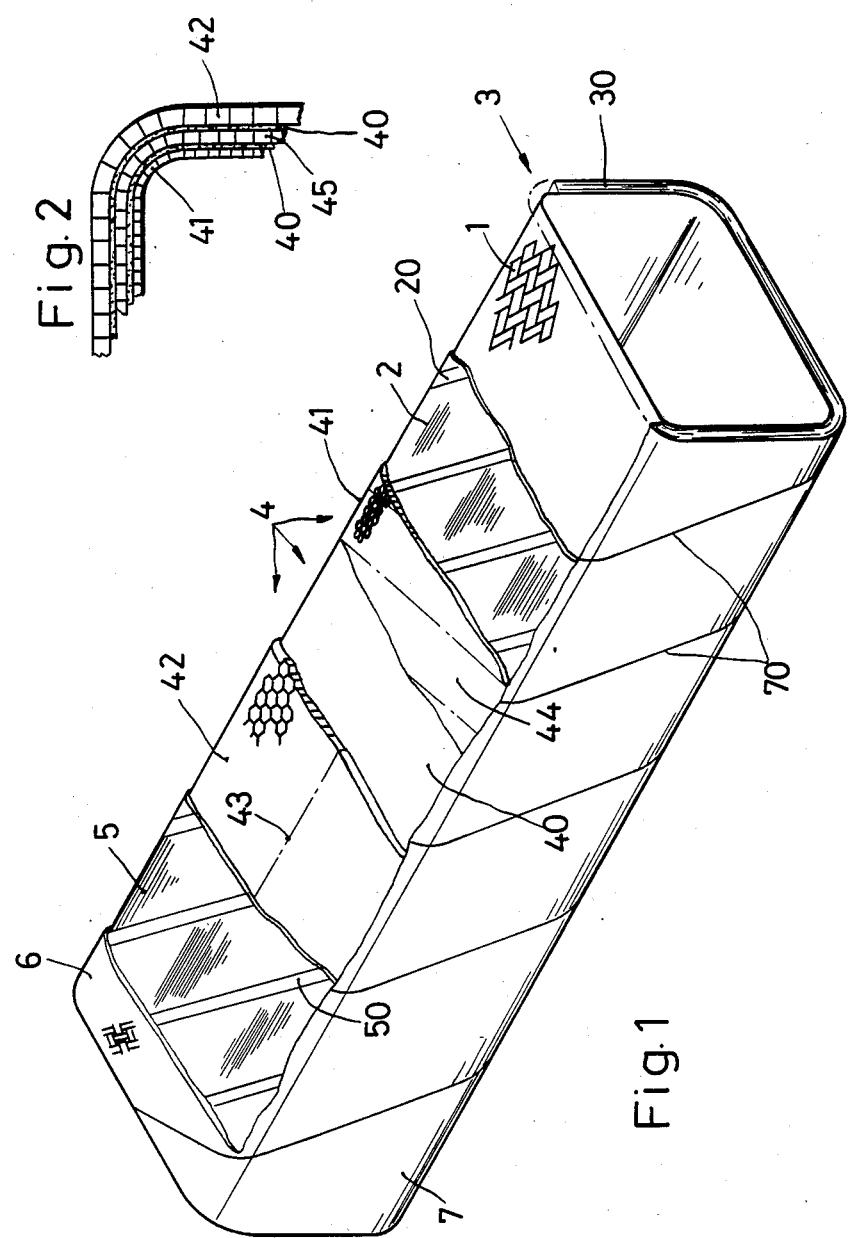

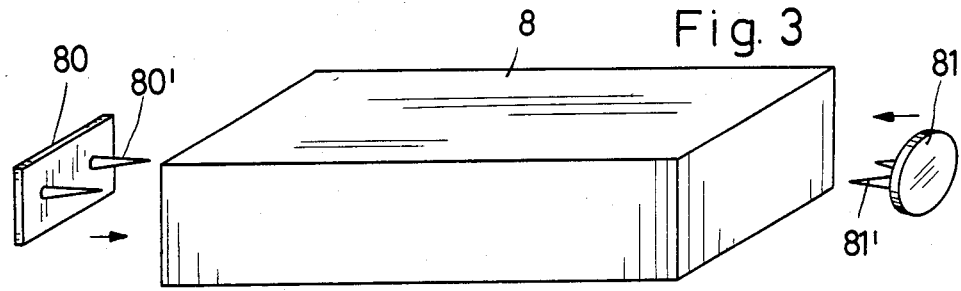
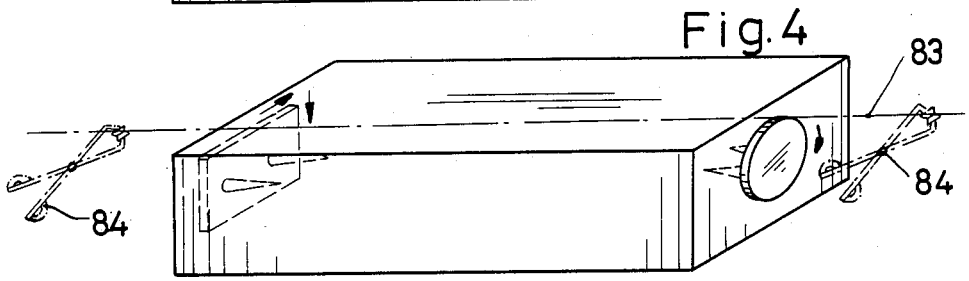
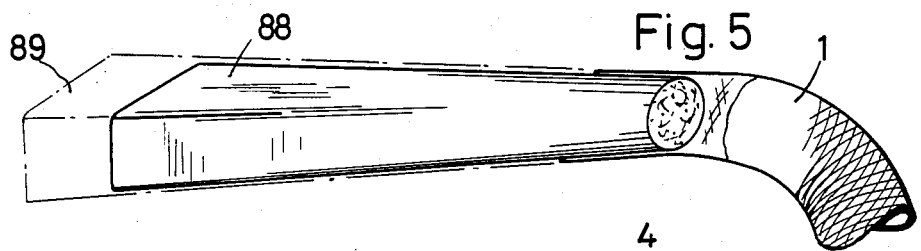
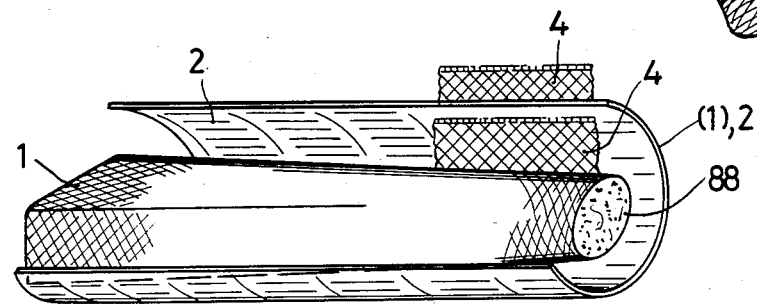
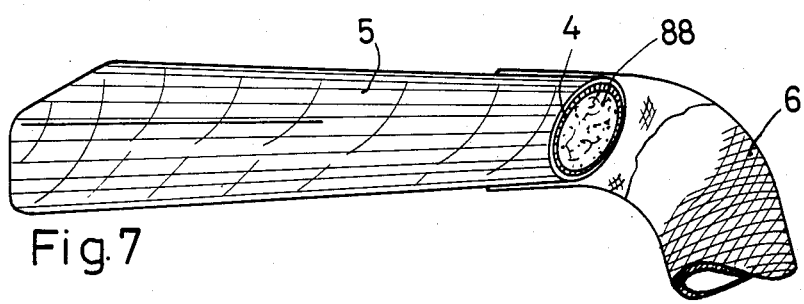

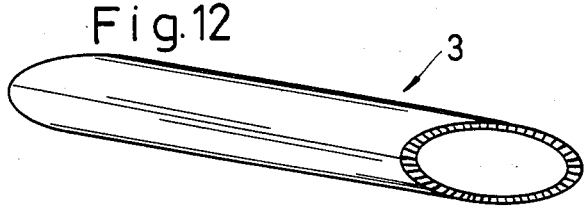
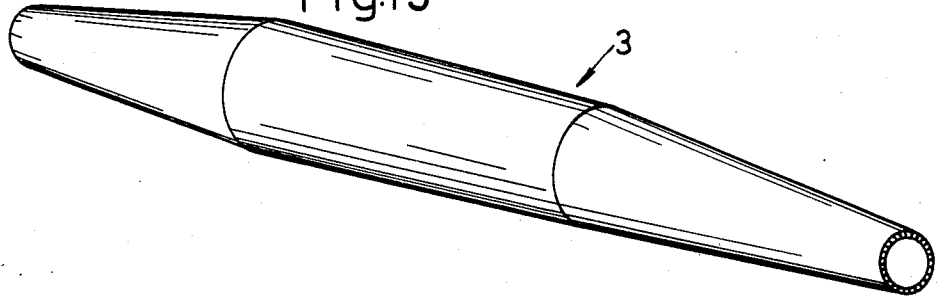
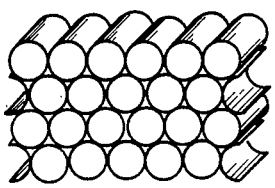
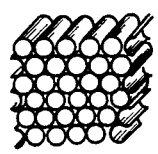
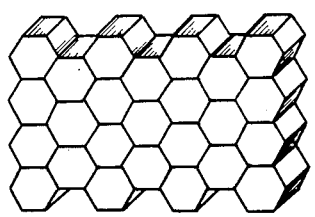
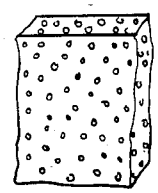
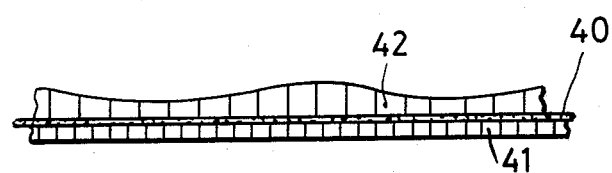

METHOD OF MANUFACTURING A SHAPE FROM A COMPOSITE MATERIAL

This application is a continuation of application Ser. No. 562,687, filed Dec. 19, 1983, now abandoned.

BACKGROUND OF THE INVENTION

The present invention relates to a method of manufacturing a shape from a composite material by applying laminations impregnated with plastic resin to a positive mold.

Similar methods of manufacturing a shape from a composite material and shapes manufactured in accordance with such a method are known from European Patent Application No. 79 103 881.3.

The advantages of shapes manufactured in accordance with such a method are that they are relatively strong and can be manufactured with little capital outlay on a light-industrial scale. The drawback thereof is that they will often not support enough load, especially in compression and flexural strength.

SUMMARY OF THE INVENTION

The object of the present invention is an improved method of the aforesaid type for manufacturing shapes that will firmly support a load while remaining light in weight.

This object is achieved in accordance with the present invention wherein at least one cellular, cellular-core layer is applied into the neutral zone of the laminations and embedded into them while the laminations are being built up. Preferably, the axis of each cell of the cellular-core layer is disposed radially of the axis of the shape.

The method in accordance with the invention now makes it possible to create a shape that, while it differs hardly at all in weight from known shapes, can support considerably more load. Its cellular-core layer provides, as a result of being embedded in the laminations, a stable framework that considerably increases in particular the transverse stability of the shape as will as its flexural strength.

In other and preferred embodiments of the present invention, the cellular-core layer can be multiple, preferably double. The multiple or double layer can manufactured as and inlaid between the laminations as a unit. The multiple or double layer can have a connective layer between each cellular-core layer. The connective layer can be made of plastic, foil, glass cloth, non-woven carbon-fiber fabric, polyimide, or woven or non-woven fabric impregnated with plastic resin. The cells in the individual cellular-core layers can be of different sizes. The dimensions of the cells in the individual cellular-core layers can increase from the positive mold outward. The cellular-core layer can be embedded into the laminates bent into a tube and abutting. The cellular-core layer can be in the form of strips and inlayed in the laminations with its edges adjacent or in the form of a helix. The cellular-core layer can be inlaid in the laminations in the form of a spiral. At least one, also spiral, lamination can be inlaid between the spirals.

Subsequent to laying a first lamination in the form of an inner supporting layer and/or shell layer on the positive mold or core and to applying a single- or multiple-lamination cellular-core layer, another lamination in the form of an outer shell layer can be applied. The finished layered structure can be secured by a coil of compression tape that is removed subsequent to curing. The coil can consist of polyamide tear-off tape.

In one embodiment of the invention an initial lamination in the form of an inner supporting layer of glass fibers, glass cloth, glass knit, or glass plait is stretched over or wrapped around a positive mold, an inner shell layer consisting of parallel carbon fibers is applied, and another lamination in the form of an outer shell layer consisting of parallel carbon fibers and an outer supporting layer consisting of glass fibers, glass cloth, glass knit, or glass plait are stretched over or wrapped around the cellular-core layer. The laminations can be applied impregnated with plastic resin and still wet. The positive mold can consist of plastic-covered foam. The parallel carbon fibers can be applied parallel to the axis of the shape. One of the layers, preferably the outer layer of the double or multiple layer, can have an undulating surface. The cellular-core layer can be made of an extruded material sliced into flexible sheets. The cellular-core layer can be made of corrugated or folded strips of foil cemented or hot-bonded together.

The cellular material comprises at least one layer of a rigid foam, such as polyurethane, polyvinyl chloride, polyacrylic, polystyrene, epoxide, polyethylene or polyester foam and is embedded into the neutral zone of the layers. The rigid foam can be closed- or open-pored or closed- or open-celled, preferably medium-pored. It can be in sheers or strips. It can also be introduced in the form of liquid components and only foamed in situ into or onto the semifinished shape.

Some preferred embodiments of the invention will now be described with reference to the attached drawings.

BRIEF DESCRIPTION OF THE DRAWINGS

FIG. 1 is a schematic illustration of a shape in accordance with the invention from which the layers have been removed to different depths to show them more clearly, FIG. 2 is a section through a shape in accordance with the invention illustrating one type of layer that can be embedded, FIGS. 3 and 4 illustrate one way of constructing a positive mold, FIG. 5 illustrates the first step in the method, which is to apply the first lamination to the mold, FIG. 6 illustrates the further buildup of a possible embodiment, FIG. 7 illustrates the application of the second lamination—the outer supporting layer—to the mold, FIGS. 8, 9 and 9a illustrate various embodiments of the layers, FIG. 10 is a schematic section through the layer of FIG. 8, FIG. 11 is a section through a double layer, FIGS. 12, 13, and 14 illustrate various embodiments of shapes manufactured in accordance with the invention.

DETAILED DESCRIPTION OF THE PREFERRED EMBODIMENTS

Figure 14:
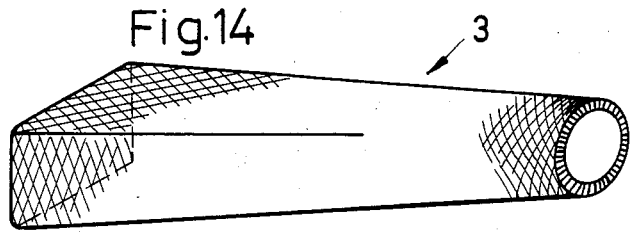

Referring to FIG. 1, an initial lamination in the form of an inner supporting layer 1 of glass fibers, glass cloth, glass knit, or glass plait is stretched over or wrapped around a positive mold, which is not illustrated in FIG. 1. The layer 1 which is illustrated in FIG. 1 is a plait. Another lamination in the form of a shell layer 2 consisting of parallel carbon fibers is laid over the inner supporting layer 1. Both layers may be impregnated with plastic resin and initially cured together. The parallel carbon fibers are connected with strips 20 of adhesive tape when the shell layer 2 is applied, facilitating its application to the inner supporting layer 1.

Although the inner supporting layer 1 can be a tubular plait, it can also be formed into a tube by butting its edges together or coiling it around the mold. Its intimate connection to shell layer 2 will provide adequate stability in any of these three cases.

Inside the wall 30 of shape 3 is a cellular-core layer 4, which can be multiple and preferably double as illustrated. In the embodiment illustrated in FIG. 1 it is a unit and has a connective layer 40 in the middle. Connective layer 40 can be made plastic, foil, glass cloth, non-woven carbon-fiber fabric, polyamide, or woven or non-woven fabric impregnated with plastic resin. It can be impregnated with a plastic resin. Connective layer 40 connects two cellular-core layers, an inner cellular-core layer 41 and an outer cellular-core layer 42. As is evident from FIG. 1, the cells of the double or multiple layer can be of different sizes and heights. Cellular-core layer 4, whether single or multiple, can enclose the inner supporting layer 1 and shell layer 2 with a simple butt joint 43 or, as illustrated by the dot-and-dash line in FIG. 1, be applied in the form of coiled strips 44, in which case the strips will abut each other.

When a cellular-core layer 4 is present, it is covered by an outer lamination. This is an outer shell layer 5 which again consists of parallel carbon fibers that can if necessary be held together by hot bonding or by strips 50 of adhesive tape, and of an outer supporting layer 6, which consists again of glass, fibers, glass cloth, glass knit, or glass plait. The outer supporting layer 6 illustrated in FIG. 1 is again plaited. The two layers 5 and 6 can also be impregnated with plastic resin and applied wet.

The finished layer structure can be retained with a coil 7 of compression tape, which can be removed after the shape as a whole has cured. This coil consists preferably of a polyamide tear-off tape.

Thus, subsequent to laying a first lamination in the form of inner supporting layer 1 and/or shell layer 2 on the positive mold or core and subsequent to applying a single- or multiple-lamination cellular-core layer 4, another lamination in the form of outer shell layer 5 and/or outer shell layer 6 is applied.

The structure and composition of the laminations can be varied. It is an advantage if the supporting layers always consist of glass fibers and the shell layers of parallel carbon fiber layers are oriented along the axis of the shape to strengthen it longitudinally to the greatest extent possible. The inner and outer supporting layers do not absolutely have to consist of glass fibers. They can consist of aramide or carbon and, as previously mentioned, be applied in the form of a woven or plaited tube.

The carbon fibers of the inner and outer shell layers can also be applied in the form of a plaited tube instead of lying parallel when no supporting layers are present.

As previously mentioned herein, the individual laminated structure above and/or below the cellular-core or honeycomb layer can also be constructed differently.

There is a great advantage to applying a coil of compression tape that can then be removed. Not only will the shape retain its form precisely until it has cured, but the laminations will also be compacted, air will be forced out of it, and the impregnation of the layers will be more uniform. The coil is pulled tight enough to prevent any air bubbles from remaining in the laminations because any air inclusions between the laminations entail a lower load-supporting capacity. Thus the coil is subjected to powerful tension.

If the shape is intended to withstand shearing forces or transverse compression forces later, a double cellular core resulting from the positioning of a double or multiple cellular-core layer is an advantage. The height and diameter of the cells can also increase from inside out. An impregnated woven or non-woven fabric based on glass and aramide or carbon fibers impregnated with multiconstituent plastic can also be positioned as a connective layer between the individual double cellular-core layers.

FIG. 2 illustrates the construction of a multiple layer with cells of varying dimensions. This embodiment has two connective layers 40, a coarser outer cellular-core layer 42 and a finer inner cellular-core layer 41 in conjunction with an intermediate cellular-core layer 45. This design makes it possible to also wrap the sections of a shape that have shorter radii. This is especially important when rectangular cross-section tubes like that illustrated in FIG. 1 are manufactured.

FIGS. 3 to 7 illustrate possible steps in the manufacture of a shape in accordance with the invention. A block-shaped mold 8, made of rigid expanded polystyrene or a similar material has templates 80 and 81, which preferably have pins 80' and 81' forced into the template material at each end.

A heated wire 83 is wrapped around the outer edges of templates 80 and 81 with tongs 84 as illustrated in FIG. 4. This operation is in itself known. The result is a positive mold 88 that can be wrapped into a film 89. When, however, the mold is to be later extracted from the finished shape, a mold release can be applied instead.

A glass-fiber fabric, elastic tube, or similar structure can then be pulled over the resulting positive mold 88 to produce an inner supporting layer 1 as illustrated in FIG. 5. A shell layer 2 of parallel carbon fibers is then applied either directly, impregnated with a multiconstituent plastic resin, or subsequent to a cellular-core layer 4 as illustrated in FIG. 6.

Over this in any case is a supplementary or unique cellular-core layer 4, which may be single, double, or multiple.

On top of this intermediate cellular-core laid 4 is layed another series of carbon fibers to form an outer shell layer 5 as illustrated in FIG. 7, over which a supporting layer 6, preferably of glass fibers, is then pulled. This can also be impregnated and also with a multiconstituent plastic resin. The shape will be finished once it has cured.

FIGS. 12 and 13 illustrate other types of shapes 3 that can be so manufactured.

FIGS. 8, 9, 9a and 10 illustrate various embodiments of a cellular-core layer. They are preferably only a few millimeters thick, 5 mm thick for example, when applied as a single layer.

Various types of cellular-core layers can be manufactured. They can be made of plastic, specifically from extruded sections of a rapidly curing material. This section, in which the cells are forced out of the extruder axially, is then cut into plates or disks of an appropriate thickness. It is, however, also possible to make the cellular-core layer out of individual sheets of plastic or aluminum appropriately cemented together.

The individual cells can preferably be hexagonal, as shown in FIG. 9, inasmuch as the hexagon is especially practical when the material is made of separate sheets. The cells can, however, also be round, as illustrated in FIGS. 8 and 10, when the material is extruded, FIG. 11 is a section through a double layer. The upper cells have a larger diameter and are higher than the lower cells. The layer can also vary in thickness. The structure of the upper cellular-core layer is selected in accordance with the desired final shape. Layers that vary in thickness can be employed to make the surface of a shape, a tubular section for example, undulate, with the thinner areas of the layer wrapped around the edges, because it is easier to structure an edge with a thinner area, as illustrated in FIG. 2. The surface of such a double layer will accordingly be wavy.

FIG. 9a shows cellular material other than the cellular-core material. The cellular material is a rigid foam of polyurethane, polyvinyl chloride, polyacrylic, polystyrene, epoxide, polyethylene, or polyester. The rigid foam can be closed- or open-pored or closed- or open-celled, preferably medium-pored. It can be in sheets or strips and processed like the honeycomb layer. It can also be introduced in the foam of liquid components and only foamed in situ into or onto the semifinished shape.

Figure 15:
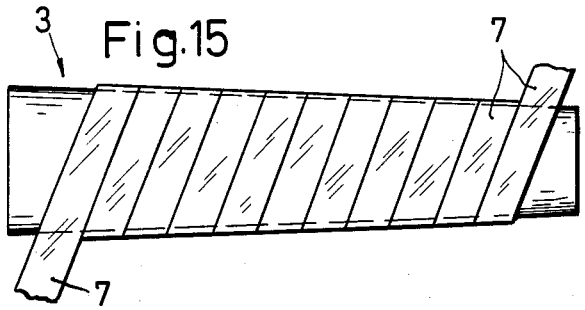
FIG. 15 illustrates a shape in accordance with the invention with all its layers finished, secured by a coil of compression tape that can be removed subsequent to curing.

FIG. 14 illustrates the final product 3 of the process illustrated in FIGS. 3 through 7. FIG. 15 illustrates how this product can be provided with a coil 7 of compression tape that can be removed subsequent to curing.

This coil can, as previously mentioned herein, be a strip of polyamide tear-off tape if necessary. It is applied with its edges overlapping subject to powerful pressure and helps to ensure the desired final shape.

Figure 16:
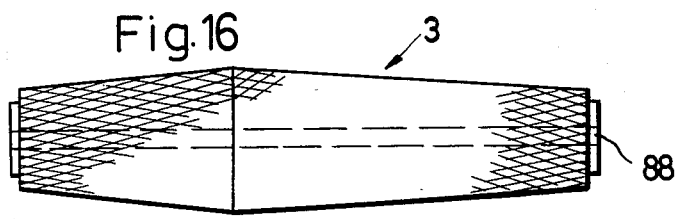
FIGS. 16, 17, and 18 illustrate further embodiments of shapes according to the invention.

It is also possible to leave the positive mold 88 inside in the shape 3 and even bore a hole through it to manufacture a rotating shape as illustrated in FIG. 16.

Figure 17:
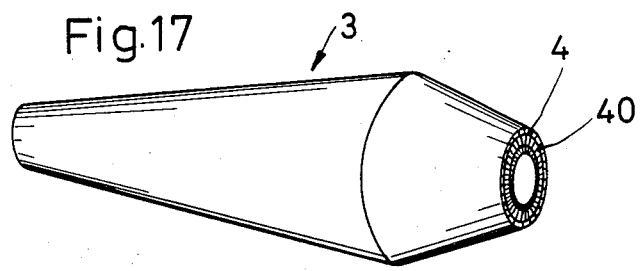
Figure 18:
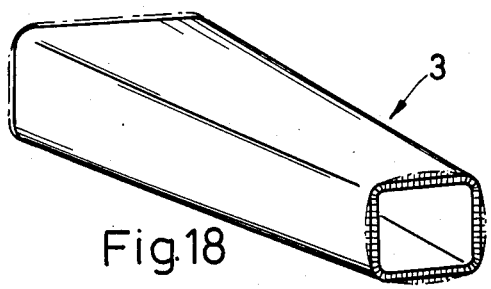

FIGS. 17 and 18 illustrate further embodiments of shapes that can be made according to the invention. FIG. 17 illustrates two attached truncated cones and FIG. 18 shows a shape with a varying rectangular cross-section. FIG. 18 also illustrates how the surface of a shape can be made to undulate.

The double or multiple layer can be manufactured and applied as a unit. The double or multiple layer can also be produced while the shape is being manufactured. The diameter, height, and configuration can be varied in accordance with the purpose for which the shape is intended. The dimensions of the cells can increase from the positive mold outward. If the cells are constructed from sheets cemented together, they should be wrapped into a lamination in a helix with their edges in contact. They can, however, also be applied in a spiral, with the end of the spiral flattened to prevent steplike irregularities in the surface of the shape. The spiral would preferably extend over the total length of the device, preferably in complete coils over the outer surface. At least one, also spiral, lamination would also be inlayed confined between the spirals and could function as a connective layer 40. A single connective layer consisting of a woven or non-woven fabric can also be placed between the spirals as illustrated in FIG. 17.

The shell layer 2 or 5 generally illustrated in most of the figures consists of parallel carbon fibers connected by strips 20 or 50 of adhesive tape. The laminations can be modified in a very large number of different ways, the cellular-core layer, however, remaining of special significance because it makes the shape more stable and, especially, flexurally stronger.

Other materials, like rigid expanded polystyrene for example, can also be employed for the positive mold. Any desired appropriate plastic can in fact be employed. The positive mold can also be a steel arbor that is expelled once the shape has cured. A glass tube can also be used for the positive mold if necessary and removed after being broken once the shape has cured. The last stage of the procedure can also be varied accordingly.

The characteristics disclosed herein are to be considered individually and in combination as essential to the invention to the extent that they are innovative with respect to the state of the art.

It will be appreciated that the instant specification and claims are set forth by way of illustration and not limitation, and that various modifications and changes may be made without departing from the spirit and scope of the present invention.

What is claimed is:

1. A method of manufacturing a shape from a composite material on a positive mold, comprising the steps of applying around the mold laminations which are impregnated with plastic resin and include reinforcing fibers, said fibers being at least substantially parallel to each other in at least one of the laminations; and embedding at least one cellular-core layer of rigid foam into a neutral zone of the laminations while the laminations are being built up, said layer constituting at least one strip which is embedded in the neutral zone in the form of a helix.

2. The method of claim 1, wherein said embedding step includes embedding into the neutral zone at least two neighboring cellular-core layers.

3. The method of claim 2, wherein the cells of the layers have different sizes and the larger cells are more distant from the mold.

4. The method of claim 2, further comprising the step of embedding a connective layer between the neighboring cellular-core layers.

5. The method of claim 4, wherein the connective layer is composed of materials selected from the group consisting of foil, plastic, glass cloth, non-woven carbon fiber fabric, polyamide, woven fabric impregnated with plastic resin and non-woven fabric impregnated with plastic resin.

6. The method of claim 1, further comprising the step of converting the layer into a tube prior to said embedding step.

7. The method of claim 1, wherein the edges of neighboring convolutions of the helix abut each other.

8. The method of claim 1, further comprising the step of inserting a spiral between the convolutions of the helix.

9. The method of claim 1, wherein said applying step includes placing a first lamination around the mold and said embedding step includes placing the layer around the first lamination, said applying step further including placing a second lamination around the layer.

10. The method of claim 9, wherein the second lamination includes several strata.

11. The method of claim 9, wherein the first lamination is composed of (a) a supporting layer of glass fibers, glass cloth, glass knit or glass plait and is stretched over or wrapped around the mold and (b) a second layer consisting of parallel fibers surrounding the supporting layer, the second lamination including an outer layer of parallel fibers.

12. The method of claim 1, wherein the plastic resin is wet during application of lamination around the mold.

13. The method of claim 1, wherein the mold consists of plastic-coated foam.

14. The method of claim 1, wherein the fibers are parallel to each other and further comprising the step of applying transverse strips of adhesive tape to the parallel fibers prior to the application of such fibers around the mold.

15. The method of claim 1, wherein the mold has a polygonal outline.

16. The method of claim 1, wherein said embedding step includes introducing the layer between the laminations in such orientation that the cells of the layer are disposed radially of the axis of the shape.

17. The method of claim 1, wherein said embedding step includes simultaneously introducing into the neutral zone at least two preformed layers.

18. The method of claim 1, wherein the layer has an undulate surface.

19. The method of claim 1, further comprising the steps of making the layer from an extruded sheet-like flexible material and subdividing such material into sheets prior to said embedding step.

20. The method of claim 1, wherein the layer is a rigid foam selected from the group consisting of polyurethane, polyvinyl chloride, polyacrylic, polystyrene, epoxide, polyethylene and polyester.

21. The method of claim 20, wherein the layer is foamed in situ.

* * * * *